Patented July 12, 1927.

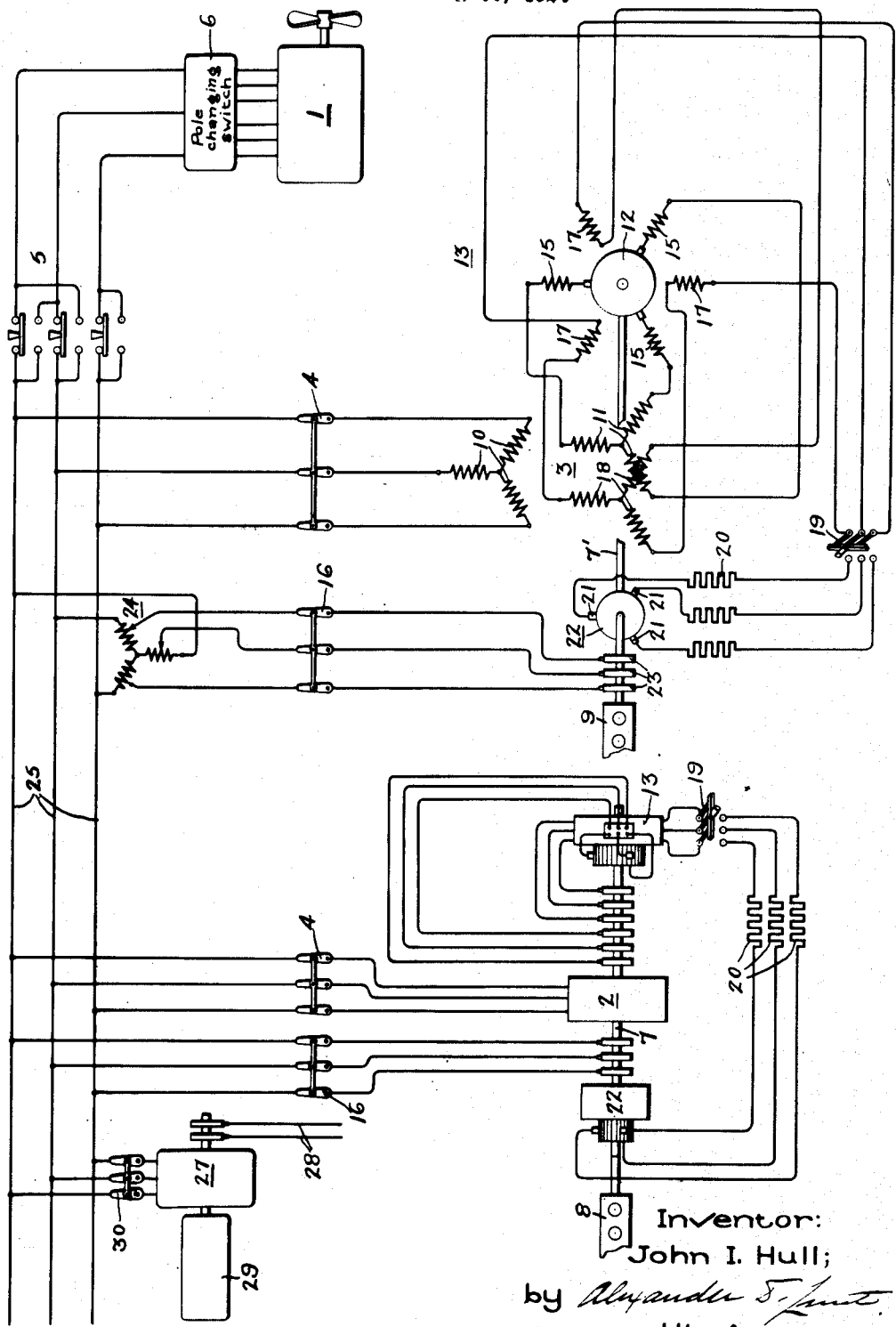

1,635,788

UNITED STATES PATENT OFFICE.

JOHN I. HULL, OF SCHENECTADY, NEW YORK, ASSIGNOR TO GENERAL ELECTRIC COMPANY, A CORPORATION OF NEW YORK.

POWER SYSTEM.

Application filed August 30, 1924. Serial No. 735,098.

My invention relates to electric power systems wherein current is supplied from induction generators driven by prime movers subject to variations in their torques and operating speeds, and has for its object the provision of an arrangement for rendering the power delivered by such generators substantially independent of variations in the torques and speeds of their respective prime movers. A further object is to provide an improved system of electric ship propulsion wherein current is supplied to a propeller motor from induction generators driven by Diesel engines or the like.

It is well known that hunting is produced when synchronous generators driven by Diesel engines are operated in parallel. In the parallel operation of induction generators, this difficulty is not so pronounced, but it is still serious enough to require the provision of means for ensuring that current is not pumped back and forth between the parallel connected induction generators due to variations in the speeds at which they are driven.

The amount of power delivered by an induction generator depends on its slip and, if the frequency at which power is delivered is maintained constant by a synchronous machine, the power delivered by the induction generator will vary with changes in the speed and torque at which it is driven. This is true for the reason that with every change in slip, there is produced a change in the value and frequency of the slip currents. In order to render the output of an induction generator independent of the speed variations to which it is subjected when driven by a Diesel engine, or like prime mover, it is therefore necessary to provide means for producing in the rotor winding of the generator voltage components which neutralize the component voltages produced therein with change in the value and the frequency of the secondary current of the slip. When this is done, the torque loads of the various parallel connected generators are maintained constant irrespective of variations in the speeds at which they are driven and hunting is prevented. In the illustrated modification of my invention, these neutralizing component voltages are applied to the rotor winding of the generator by means of a commutator machine which is excited by a current proportional in value to the sum of the generator rotor winding resistance drop and induced voltage.

My invention will be better understood from the following description when considered in connection with the accompanying drawing and its scope will be pointed out in the appended claims.

The drawing shows a load device illustrated as a propeller motor 1 which is arranged to be supplied with current from generators 2 and 3 through generator switches 4, reversing switch 5 and pole changing switch 6. The shafts 7 and 7' of the generators 2 and 3 respectively are arranged to be driven by prime movers shown as Diesel engines 8 and 9. Each of the generators 2 and 3 is provided with a stator or primary winding 10 and a secondary winding 11 which is arranged to be interconnected with the armature winding 12 of a commutator regulating machine 13 through its compensating winding 15.

The exciting field winding 17 of the commutator machine 13 is arranged to be supplied with component currents which are proportional in value respectively to the magnitudes of the resistance drop and induced voltage of the generator secondary winding 11. At one end the different phases of the exciting field winding 17 are connected to a generator tertiary winding 18 which may be placed in the same slots as the secondary winding 11.

At the other end these phase windings are arranged to be connected through the switch 19 and resistors 20 to the commutator brushes 21 of a frequency changer exciter 22, the armature winding of which is connected to a commutator at one end and at the other end is arranged to be connected through slip rings 23, switch 16, and adjustable transformer 24 to the line 25 by which the generators are connected to the propeller motor. The resistors 20 which act as stabilizing means are so designed as to ensure that the resistance voltage drop of the commutator machine exciting field is large as compared with its reactive voltage drop. The exciter 22 and regulating machine 13 may be mounted on the generator shaft 7' if of the same number of poles as the generator. When thus driven, the currents of the regulating machine are automatically maintained at a frequency the same as the slip frequency of the generator.

It will be readily understood that the exciter 22 when supplied with current from the line 25 impresses on the exciting field windings 17 polyphase voltages of a value which is substantially constant for any given adjustment of the transformer 24, and that these voltages will always be of the same frequency as that of the rotor slip currents. Since the currents produced in the windings 17 by these voltages are also substantially constant, there is applied to the secondary winding 11 by the regulating machine 13 polyphase voltages which are substantially constant in value and which may be utilized to neutralize the resistance voltage drop of this winding.

When the generator 3 is driven at a speed different from that of the rotating field produced in its stator member by reason of its connection with the line 25, this rotating field is cut by the tertiary winding 18 and there is thus produced in the circuit of the exciting field windings 17 currents of slip frequency which are proportional in value to the magnitude of the voltage induced in the generator secondary winding. By reason of these component currents, there is applied to the secondary winding 11 by the regulating machine 13 a voltage which is proportional in value to the generator induced voltage and which may be utilized to neutralize the change in this voltage occasioned by variations in the generator speed.

The use of the exciter 22 renders available at synchronous speed excitation of a value sufficient to produce enough voltage to overcome the ohmic drop at whatever current it is desired to circulate in the main secondary circuit of the generator. Thus, the output of the generator being proportional to the current in the main secondary circuit is adjusted at will by variation in the voltage of the exciter. The tertiary winding, by its action in cancelling through the medium of the regulating machine any slip voltage of the main generator, thus allows the output of the generator to remain constant even though its speed may vary, providing of course its primary frequency is in the meantime not changed.

With the exciter and regulating machines arranged as shown, there are thus applied to the secondary winding 11 component voltages which render the generator load substantially independent of the speed variations to which it is ordinarily subjected and the tendency to hunting due to variations in the prime mover speeds is almost, if not altogether, eliminated. It will be readily understood that the regulating machine exciting component which is proportional in value to the generator induced voltage may be supplied through means other than a generator tertiary winding such as by a small induction machine which is mounted on a generator shaft and has its stator and rotor windings connected respectively to the line 25 and to the circuit of the field winding 17, or by a polyphase winding wound on the stator of the exciter 22 for example.

The control equipment of the generator 2 is similar to that of the generator 3 and in order to facilitate an understanding of the drawing, like parts in the two control equipments have been indicated by the same reference characters. For the purpose of simplifying the drawing, the adjustable transformer in the control equipment of generator 2 has been omitted. A synchronous machine 27 is provided for setting the frequency of the system and supplying the exciting current of the induction machines associated therewith. The machine 27 is arranged to be supplied with exciting current through the leads 28 and may be driven by a prime mover 29 of any suitable type. A switch 30 is provided for connecting the machine 27 to the line 25. The motor 1 is designed to operate with different numbers of poles in order that it may be enabled to exert the torque required to drive its load at starting and during reversal. It will of course be understood that any other means for producing this result, such as a double squirrel cage rotor for example, may be employed.

Assuming the switches 5, 16 and 19 to be closed and the pole changing switch to be in a position to connect the motor for operation on the higher number of poles, the motor may be accelerated by bringing the machines 2, 3 and 27 up to their normal operating speeds and closing the switches by which these machines are interconnected with the line 25. With these connections, the motor 1 will be accelerated to a speed corresponding to the higher number of motor primary poles. Further changes in speed may be produced by manipulation of the pole changing switch 6. Reversal in the direction of motor rotation may be effected by operating the switch 6 to its higher pole position and by operating the switch 5 to reverse the phase rotation between the generators and the motors. With these connections, the motor will be brought to rest and accelerated in the reverse direction to a speed corresponding to the higher pole number. To increase the motor speed in the reverse direction, the switch 6 may be operated to a position to produce the lower number of poles. The further operation of the system will be readily understood without detailed explanation.

As will be evident to those skilled in the art, my invention permits of various changes and modifications without departing from the true spirit thereof or from the scope of the appended claims.

What I claim as new and desire to secure by Letters Patent of the United States is:—

1. An electric ship propulsion system wherein current is supplied to a propeller motor from a plurality of parallel connected generators of the induction type driven by prime movers subject to momentary variations in their speeds and driving torques, characterized by the fact that a secondary winding of each of said generators is interconnected with a regulating machine and means are provided to control the excitation of said regulating machine in accordance with the resistance drop and induced voltage of said generator winding whereby the torque loads of said generators are rendered substantially independent of said variations in the speeds and torques of their prime movers.

2. An electric ship propulsion system wherein current is supplied to a propeller motor from an induction generator driven by a prime mover subject to variations in its speed and driving torque comprising a regulating machine interconnected with the secondary winding of said generator, an exciting winding for said regulating machine, and means for controlling the excitation of said winding of said regulating machine in accordance with the resistance drop and induced voltage of said secondary winding whereby the torque load of said generator is rendered independent of said variations in the torque and speed of said prime mover.

3. An electric power system wherein current is supplied to a load device from an induction generator driven by a prime mover subject to variations in its speed and driving torque, characterized by the fact that a regulating machine having an exciting winding and means for controlling its excitation in accordance with the resistance drop and induced voltage of the secondary winding of said generator is interconnected with said secondary winding for rendering the torque load of said generator independent of said variations in the speed and torque of its prime mover.

4. An electric power system wherein current is supplied to a load device from an induction generator driven by a prime mover subject to variations in its speed and driving torque, comprising a regulating machine interconnected with the secondary winding of said generator, an exciting winding for said regulating machine, a generator tertiary winding connected to said exciting winding for varying the excitation of said machine in accordance with the induced voltage of said secondary winding, and means connected to said exciting winding for adjusting the excitation of said machine in accordance with the resistance drop for any desired current in the circuit of the secondary winding.

5. An electric power system wherein current is supplied to a load device from an induction generator driven by a prime mover subject to variations in its speed and driving torque, comprising a regulating machine interconnected with the secondary winding of said generator, an exciting winding for said regulating machine, a generator tertiary winding connected to said exciting winding for varying the excitation of said regulating machine in accordance with the induced voltage of said secondary winding, and an exciting machine connected to said exciting winding to adjust the excitation of said regulating machine in accordance with the resistance drop for any current desired in the circuit of the secondary winding.

6. An electric power system wherein current is supplied to a load device through a power line from an induction generator driven by a prime mover subject to variations in its speed and driving torque, comprising a regulating machine which is provided with an exciting winding and which is interconnected with the secondary winding of said generator, a generator tertiary winding connected to said exciting winding for supplying thereto a component current proportional in value to the induced voltage of said secondary winding, and a frequency changer exciter connected between said line and said exciting winding for supplying to the latter a component current proportional in value to the resistance drop of the current desired in said secondary winding.

7. An electric power system comprising an induction generator subject to variations in its speed, means for setting the frequency of said system, a regulating machine, an exciting winding for said regulating machine, means for exciting said winding by a component of current of predetermined value and of slip frequency and by a component of current proportional in value to the voltage induced in the secondary of said generator by variations in the generator speed and means for stabilizing the said exciting current whereby the output of said generator is maintained constant.

8. An electric power system comprising an induction generator subject to variations in its speed, means for setting the frequency of said system and means for supplying to the secondary of said generator a current of predetermined value and slip frequency and for opposing any slip voltage induced in the secondary of the generator by variations in the generator speed.

In witness whereof I have hereunto set my hand this 28th day of August, 1924.

JOHN I. HULL.